US008280583B2

(12) United States Patent
Stählin et al.

(10) Patent No.: US 8,280,583 B2
(45) Date of Patent: Oct. 2, 2012

(54) TRANSMISSION OF VEHICLE-RELEVANT DATA OF A VEHICLE VIA MOBILE COMMUNICATION

(75) Inventors: Ulrich Stählin, Eschborn (DE); Marc Menzel, Marburg (DE); Robert Baier, Dieburg (DE); Bettina Erdem, Mammolshain (DE); Thomas Willnecker, Weil im Schönbuch (DE); Robert Gee, Lake Barrington, IL (US); Ulrich Möller, Holzkirchen (DE); Maik Schäfer, Friedrichshafen-Kluftern (DE); Oleg Bauer, Gießen (DE); Markus Aunkofer, Abensberg (DE)

(73) Assignee: Continental Teves AG & Co. oHG (DE)

( * ) Notice: Subject to any disclaimer, the term of this patent is extended or adjusted under 35 U.S.C. 154(b) by 0 days.

(21) Appl. No.: 12/747,358

(22) PCT Filed: Dec. 11, 2008

(86) PCT No.: PCT/EP2008/067344
§ 371 (c)(1),
(2), (4) Date: Jan. 7, 2011

(87) PCT Pub. No.: WO2009/074655
PCT Pub. Date: Jun. 18, 2009

(65) Prior Publication Data
US 2011/0098877 A1 Apr. 28, 2011

(30) Foreign Application Priority Data

| Dec. 11, 2007 | (DE) | 10 2007 059 829 |
| Feb. 14, 2008 | (DE) | 10 2008 009 331 |
| Feb. 26, 2008 | (DE) | 10 2008 011 196 |
| Apr. 30, 2008 | (DE) | 10 2008 021 723 |
| Apr. 30, 2008 | (DE) | 10 2008 021 725 |
| Apr. 30, 2008 | (DE) | 10 2008 021 780 |
| Sep. 10, 2008 | (DE) | 10 2008 041 979 |
| Oct. 21, 2008 | (DE) | 10 2008 043 010 |
| Oct. 22, 2008 | (DE) | 10 2008 043 050 |
| Oct. 22, 2008 | (DE) | 10 2008 043 075 |
| Oct. 22, 2008 | (DE) | 10 2008 043 080 |
| Oct. 22, 2008 | (DE) | 10 2008 043 081 |

(51) Int. Cl.
*G06F 7/00* (2006.01)

(52) U.S. Cl. ............ 701/36; 701/19; 701/23; 701/24; 701/28; 701/117; 700/304; 455/462; 455/463; 455/464; 455/465; 455/466; 370/342; 370/343; 180/168; 180/272; 318/587

(58) Field of Classification Search ............ 701/1, 19, 701/23, 24, 28, 29, 33, 36, 117, 118, 200, 701/208, 301; 340/870.18, 853.1, 853.2, 340/853.3, 853.9, 855.3, 855.4, 870.01–870.44, 340/901–905, 426.16, 435, 436, 445–448, 340/502–540, 825–825.02, 2.1–3.9, 825.36, 340/825.39, 7.1–7.63, 825.49, 825.53, 5.62, 340/5.64, 5.72, 10.5, 426.28, 438, 928, 933, 340/937, 988; 700/304; 455/462–466, 41.1, 455/41.2, 500, 90.2, 179.1–200.1; 370/342, 370/343; 398/125; 180/168, 272; 318/587; 307/10.1, 10.5; 705/13; 235/375, 384

See application file for complete search history.

(56) References Cited

U.S. PATENT DOCUMENTS

| 5,541,985 | A  | * | 7/1996  | Ishii et al. ................ 379/111 |
| 5,678,196 | A  | * | 10/1997 | Doyle ........................ 455/466 |
| 6,615,137 | B2 | * | 9/2003  | Lutter et al. ................ 701/301 |
| 7,499,675 | B2 | * | 3/2009  | Tsuzuki et al. ............... 455/73 |
| 7,706,963 | B2 | * | 4/2010  | Parikh et al. ................ 701/117 |
| 2006/0015242 | A1 |   | 1/2006  | Yoshida |
| 2006/0259353 | A1 | * | 11/2006 | Gutmann .................... 705/13 |
| 2007/0106431 | A1 |   | 5/2007  | Tsuzuki et al. |
| 2010/0291874 | A1 | * | 11/2010 | Himmelstein ............ 455/41.2 |

FOREIGN PATENT DOCUMENTS

| EP | 1 705 835 | 9/2006 |
| WO | WO2004 049741 A | 6/2004 |

* cited by examiner

*Primary Examiner* — James Trammell
*Assistant Examiner* — McDieunel Marc
(74) *Attorney, Agent, or Firm* — RatnerPrestia (57) ABSTRACT

A device, method, computer program and computer readable medium allowing for vehicle to vehicle and vehicle to infrastructure communication. An ignition key radio technology may used in addition to WLAN-based communication in a vehicle in order to communicate with other vehicles or infrastructure. The ignition key radio technology is used to send only selected data which have been altered significantly. The remaining data are not sent or kept for the WLAN communication.

27 Claims, 4 Drawing Sheets

TRANSMISSION OF VEHICLE-RELEVANT DATA OF A VEHICLE VIA MOBILE COMMUNICATION

CROSS REFERENCE TO RELATED APPLICATIONS

This application is the U.S. national phase application of PCT International Phase Application No. PCT/EP2008/067344, filed Dec. 11, 2008, which claims priority to German Patent application No. 10 2007 059 829.9, filed Dec. 11, 2007, and also German Patent applications No. 10 2008 009 331.9, filed Feb. 14, 2008, No. 10 2008 011 196.1, filed Feb. 26, 2008, No. 10 2008 021 723.9, filed Apr. 30, 2008, No. 10 2008 021 725.5, filed Apr. 30, 2008, No. 10 2008 021 780.8, filed Apr. 30, 2008, No. 10 2008 041 979.6, filed Sep. 10, 2008, No. 10 2008 043 010.2, filed Oct. 21, 2008, No. 10 2008 043 080.3, filed Oct. 22, 2008, No. 10 2008 043 081.1, filed Oct. 22, 2008, No. 10 2008 043 050.1, filed Oct. 22, 2008, No. 10 2008 043 075.7, filed Oct. 22, 2008, the contents of such applications being incorporated by reference herein.

FIELD OF THE INVENTION

The invention relates to communication and safety technology for vehicles. In particular, the invention relates to a communication device for a vehicle for wirelessly transmitting vehicle-related data to another vehicle or to an infrastructure, a driver assistance system, a vehicle with a communication device, the use of a communication device in a vehicle, a method, a computer program product and a computer-readable medium.

BACKGROUND OF THE INVENTION

Technologies for vehicle-to-vehicle communication and vehicle-to-infrastructure communication (C2X communication) on the basis of cellular mobile radio are known. Floating car data are likewise already known.

C2X communication is typically associated with WLAN-based communication technology. The most important application for the C2X communication is for warning about vehicles in a concealed approach, e.g. at junctions. In this context, a junction assistance function is also referred to.

For the C2X applications, a frequency band at 5.9 GHz is cleared (to be more precise: between 5875 MHz and 5905 MHz). Unfortunately, radio waves in this frequency range are absorbed by houses, shrubs, parking cars, etc., in exactly the same way as visible light. For this reason, direct communication between the vehicles at a junction does not become possible until the vehicles are in visual contact with one another, as a result of which the benefit of C2X communication for the junction assistance function is limited. In the license-free ISM bands (Industrial, Scientific, and Medical Band, frequency bands below 1 GHz), visual contact must not be absolutely necessary, in contrast to the 5.9 GHz frequency band, but the available band width in that case is significantly lower.

SUMMARY OF THE INVENTION

It is an object of the invention to allow improved communication between vehicles.

The invention specifies a communication device for a vehicle, a vehicle, a use, a method, a computer program product and a computer-readable medium according to the features described herein.

The exemplary embodiments described relate in equal measure to the communication device, the driver assistance system, the vehicle, the use, the method, the computer program product and the computer-readable medium. In other words, the features cited below in respect of the communication device can also be implemented in the driver assistance system, method, the program element or the computer-readable medium, and vice versa.

In line with one exemplary embodiment of the invention, a communication device for a vehicle for wirelessly transmitting vehicle-related data to another vehicle or an infrastructure is specified, wherein the communication device has a first communication unit for transmitting first vehicle-related data to the other vehicle and a second communication unit for transmitting selected second vehicle-related data to the other vehicle.

The use of two communication units allows important, limited information to be transmitted via the second communication unit, so that there is the assurance that this information actually arrives at the receiver. The remaining data can be transmitted via the first communication unit—possibly with a higher bandwidth but a shorter range. The effect which may be achieved by this is that the most important data reach the receiver regardless of the ambient conditions for the vehicles.

The use of already existing communication technologies for the second communication unit (but also for the first communication unit) allows the problem of shadowing by buildings, etc., to be overcome very easily and inexpensively. The demands of WLAN-based communication are not affected in this case.

In line with a further exemplary embodiment of the invention, the second communication unit is in the form of a wireless access and driving authorization unit.

Hence, the second communication unit performs a dual function. Firstly, it may be used for communication with the other vehicles or the infrastructure, in order to transmit the selected second data. Secondly, it can be used for access authorization and/or for starting the vehicle.

In line with a further exemplary embodiment of the invention, the first communication unit is designed for transmitting the first vehicle-related data on the basis of WLAN.

In line with a further exemplary embodiment of the invention, the first vehicle-related data are transmitted at a first band-limited frequency. Similarly, the second vehicle-related data are transmitted at a second band-limited frequency, which is lower than the first frequency.

In this way, the transmission range of the second data can be increased if the radio transmission link is blocked by obstacles.

In line with a further exemplary embodiment of the invention, the second data are basic information, such as a vehicle identification (vehicle ID), a position of the vehicle, a speed of the vehicle and/or a direction of movement of the vehicle.

For this purpose, the vehicle contains appropriate sensors in order to sense the vehicle position, the vehicle speed and the direction of movement.

In line with a further exemplary embodiment of the invention, the second vehicle-related data transmitted are only data which have altered significantly from the last transmission.

If the vehicle is stationary, for example, the position of the vehicle is not transmitted again. If the vehicle is moving at high speed, the vehicle position may be transmitted at a relatively high frequency. If the vehicle brakes sharply, the speed and/or the position of the vehicle are transmitted correspondingly often, whereas a lower transmission frequency is sufficient if the vehicle is moving uniformly and in a straight line.

In this way, the data traffic can be adapted individually and hence reduced.

In line with a further exemplary embodiment of the invention, the first data and the second data respectively have a vehicle identification, the first data being associated with the second data (or vice versa) by means of said vehicle identification.

In line with a further exemplary embodiment of the invention, the first data and the second data are transmitted in the same format. This makes it possible to ensure that a terminal is also able to read the second data if it can read the first data (and vice versa).

In line with a further exemplary embodiment of the invention, the communication device is designed for junction assistance.

In line with a further exemplary embodiment of the invention, the communication device transmits the second data only if the engine of the vehicle is running, the hazard lights on the vehicle have been activated or the vehicle sensor system has detected an accident.

In all other cases, the second communication unit can adopt another function, for example the function of an electronic key.

In line with a further exemplary embodiment of the invention, carrier sense multiple access is used for congestion control in the communication via the second communication unit.

In line with a further exemplary embodiment of the invention, the second communication unit is used for transmitting only prioritized data.

In line with a further exemplary embodiment of the invention, the second communication unit is designed for communication between the communication device and an infrastructure.

In line with a further exemplary embodiment of the invention, the second communication unit is designed for periodically transmitting a search command to a pedestrian.

In line with a further exemplary embodiment of the invention, the second communication unit is designed for providing redundancy for a safety application in the vehicle.

In line with a further exemplary embodiment of the invention, the communication device is designed for fusing measurement data from a simple ambient sensor with data received from another vehicle or an infrastructure for the purpose of situation interpretation.

In line with a further exemplary embodiment of the invention, the first communication unit is designed for selecting a communication partner and stipulating which communication device and possibly which communication channel is meant to be used for further communication between the vehicle and the communication partner.

In line with a further exemplary embodiment of the invention, the second communication unit is designed to enable a communication link to be set up to the outside and/or to enable a communication link to be accepted.

In line with a further exemplary embodiment of the invention, the communication device is designed for warning an adjacent vehicle following an accident involving its own vehicle via the second communication unit.

In line with a further exemplary embodiment of the invention, the communication device is designed for transmitting a notification upon receipt of an inherent identification number for theft prevention.

In line with a further exemplary embodiment of the invention, the communication device has a sleep mode, wherein the communication device is designed to be able to decide, in sleep mode, whether a received message is a message specifically for the vehicle or is a general C2X message for a large number of vehicles.

In line with a further exemplary embodiment of the invention, the communication device is designed for the receipt of messages from a road sign (601) by the second communication unit and for the further use of the received message by a driver assistance system.

In line with a further exemplary embodiment of the invention, a driver assistance system with a communication device as described above is specified.

In line with a further exemplary embodiment of the invention, a vehicle with a communication device as described above is specified.

In line with a further exemplary embodiment of the invention, the use of a communication device as described above in a vehicle is specified.

In line with a further exemplary embodiment of the invention, a method for transmitting vehicle-related data from a vehicle by means of mobile communication to another vehicle or an infrastructure is specified, in which first vehicle-related data are transmitted to the other vehicle or the infrastructure by a first communication unit, and in which selected second vehicle-related data are transmitted to the other vehicle or the infrastructure by a second communication unit.

In line with a further exemplary embodiment of the invention, for the purpose of performing the method, the second communication unit is in the form of a wireless access and driving authorization unit, the first communication unit being designed for transmitting the first vehicle-related data on the basis of WLAN. In addition, the first vehicle-related data are transmitted at a first band-limited frequency. Similarly, the second vehicle-related data are transmitted at a second band-limited frequency, which is lower than the first frequency.

In addition, in line with a further exemplary embodiment of the invention, a computer program product is specified which, when executed on a processor, instructs the processor to perform the steps described above.

In line with a further exemplary embodiment of the invention, a computer-readable medium is specified which stores a computer program product which, when executed on a processor, instructs the processor to perform the steps specified above.

In line with one exemplary embodiment of the invention, ignition key radio technology is used in addition to WLAN-based communication only when the engine is running and in the event of a breakdown even when the vehicle is stationary.

In addition, it is possible to send only a few data via the second communication unit (for example radio key system) in order to make optimum use of the low bandwidth of the second communication unit. By way of example, data are sent only if they have altered significantly.

During the communication, the same vehicle identification (vehicle ID) is used as in the case of the WLAN communication in order to be able to associate the data with one another.

By way of example, the second communication unit is used to perform only a "single-hop" broadcast, whereas the first communication unit (WLAN system) can also be used to perform multihop communication.

At this juncture, it should be pointed out that, within the context of the present invention, GPS is representative of all global navigation satellite systems (GNSS), such as GPS, Galileo, GLONASS (Russia), Compass (China), IRNSS (India), . . . .

The term "digital maps" is also intended to be understood to mean maps for advanced driver assistance systems (ADAS), without any navigation taking place.

By way of example, the vehicle is a motor vehicle, such as a car, bus or heavy goods vehicle, or else is a rail vehicle, a ship, an aircraft, such as a helicopter or airplane, or, by way of example, it is a bicycle.

Exemplary embodiments of the invention are described below with reference to the figures.

BRIEF DESCRIPTION OF THE DRAWINGS

The invention is best understood from the following detailed description when read in connection with the accompanying drawings. Included in the drawings is the following figures.

The illustrations of the figures are schematic and not to scale.

In the description of the figures which follows, the same reference numerals are used for the same or similar elements.

DETAILED DESCRIPTION

Figure 1:
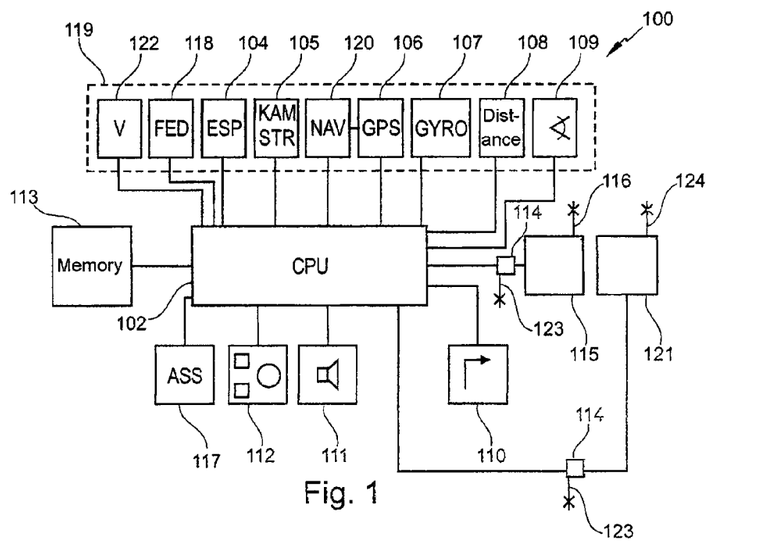
FIG. 1 shows a schematic illustration of a communication device based on an exemplary embodiment of the invention.

FIG. 1 shows a schematic illustration of a communication device 100 for a vehicle for wirelessly transmitting vehicle-related data to another vehicle or to a fixed infrastructure. The communication device 100 is installed in the vehicle, for example, and has a first communication unit 115 with an antenna 116, a second communication unit 121 with an antenna 124 and a control unit 102.

Data to be sent which are transmitted by the control unit 102, which is in the form of a CPU, for example, to the communication unit 115 or else to the communication unit 121 may respectively be encrypted by means of one or more encryption devices 114. For the purpose of transmitting the data from the CPU 102 to the second communication unit 121, this may involve the provision of the antenna 123, which is mounted on the encryption unit 114, for example. For the purpose of receiving these data and for the purpose of sending to the other vehicles, the second communication unit 121 likewise has an antenna 124. However, the second communication unit may also be part of the communication device 100.

Similarly, it is also possible for the received data which are transmitted from the communication unit 115 or from the communication unit 121 to the control unit 102 to be decrypted by the encryption unit 114.

In this way and by dynamically changing the identification number, it is possible to reduce the risk of misuse and to ensure data protection.

The control unit 102 has an input unit 112 connected to it. The input unit 112 can make various settings on the communication device and possibly also on the navigation unit 120 linked thereto. In addition, a visual output unit in the form of a monitor 110 is provided which can be used to output routing information, for example. Furthermore, said routing information and possibly also warnings can be output by means of an audible output unit 111. Output by means of the audible output unit 111 has the advantage that the driver is distracted less from what is currently happening in the traffic.

A memory element 113 which is connected to the control unit 102 or is integrated in the control unit 102 stores the digital map data (e.g. as navigation map data) in the form of data records. By way of example, the memory element 113 also stores additional information about traffic restrictions, infrastructure devices and the like in association with the data records.

In addition, a driver assistance system 117 is provided which is supplied with the digital map data, positions of other objects or other information from the communication.

For the purpose of determining the current vehicle position, the communication device 100 has the navigation unit 120 and the positioning unit 106, said positioning unit being designed for receiving position signals from Galileo satellites or GPS satellites, for example. Naturally, the navigation unit with the satellite navigation receiver 106 may also be designed for other satellite navigation systems.

The positioning unit 106 is connected to the control unit 102. The navigation unit 120 is also connected to the control unit 102. In addition, there is a direct connection between the navigation unit 120 and the positioning unit 106. Hence, the GPS signals can be transmitted to the CPU 102 directly.

Since it is not always possible to receive the position signals in city centers, for example, the communication device also has a direction sensor 107, a distance sensor 108, a steering wheel angle sensor 109, a spring excursion sensor 118, an ESP sensor system 104 and possibly a detector 105, for example in the form of a camera or a beam sensor (radar or lidar sensor), for the purpose of performing compound navigation. In addition, the detection unit 119 has a speedometer 122.

The signals from the GPS receiver and the remaining sensors are handled in the control unit 102. The vehicle position ascertained from these signals is aligned with the road maps by the map matching. The routing information obtained in this manner is finally output via the monitor 110.

The communication unit 121 is in the form of a wireless access and driving authorization unit (RKE, Remote Keyless Entry). In almost all current ranges of private vehicles, wireless access and driving authorization units which work within the country-specific and license-free ISM frequency bands (Industrial, Scientific, and Medical Band) are used. For an overview, reference is made to the overview of frequency and permitted transmission power in Table 1, which is provided by way of example and is merely to be understood as an extract. These units installed in the vehicle can attain ranges of more than 1000 m if there are no obstacles in the way. On account of the relatively high wavelength, the signals are very easily bent around almost any obstacle. In addition, there is also only a limited bandwidth available for the data transmission, which means that these frequencies are ineligible as solitary carriers of the C2X communication if large volumes of data need to be transmitted.

TABLE 1

Frequency band and transmission power/market overview

| | | |
|---|---|---|
| EU | 434 MHz | +10 dBm |
| | 868 MHz | +14 dBm |
| US | 315 MHz | −25.6 . . . −5.6 dBm |
| | 902 MHz | −7.25 dBm |
| | 902 MHz | +30 dBm for DSSS |
| JP | 315 MHz | −6 dBm . . . −16 dBm |
| | 426 MHz | 0 dBm measured at 50 ohms |
| | 429 MHz | +10 dBm measured at 50 ohms |

TABLE 1-continued

Frequency band and transmission power/market overview

| KOR | 434 MHz | +4.7 dBm |
| | 447 MHz | +7 dBm measured at 50 ohms |
| CHN | 434 MHz | +10 dBm |
| | 868 MHz | +7 dBm |

A core aspect of the invention can be seen in that the WLAN-based communication (of the first communication unit) is extended by additional messages which are broadcast and received by means of the ignition key system 121, 124. In order to use up as little bandwidth as possible per vehicle, only very little basic information is transmitted by means of the "ignition key" communication: the vehicle ID, location, speed and direction of movement. This information can then be used to set up a basic functionality or junction assistance. As soon as the vehicles make visual contact or contact via a relay station (what is known as a road side unit RSU) or another vehicle, is possible for further information to be interchanged by means of the WLAN-based communication and for the entire set of C2X functions to be used.

So that the data from WLAN- and "ignition key" communication can be associated with one another, both systems need to use the same vehicle identification (vehicle ID), for example. This ID can be changed dynamically in order to allow the data protection. The transmitted data have the same format on all transmission channels, for example, in order to be comparable. So as also to economize on bandwidth, all the aforementioned data are not sent constantly, but rather only those data which have altered significantly since the last transmission. By way of example, these are location and position statements, which are sent every 250 milliseconds, for example. If movement is uniform, the current vehicle speed is sent every 1000 milliseconds, and during braking it is sent every 250 milliseconds. The direction of movement is sent every 2000 milliseconds when the vehicle is traveling in a straight line, and when the vehicle is traveling around a bend it is sent every 250 milliseconds to 1000 milliseconds, depending on the radius of the bend.

The relevant data are measured by means of the detection device 119 and are then stored in the memory 113, for example, possibly after conditioning or analysis by the CPU 102.

So as not to impair the driving authorization function, the module continues to be used for opening and closing the doors when the vehicle is stationary with the engine switched off. When the engine is running, it is then changed to the C2X mode. Should a vehicle have broken down and the hazard lights have been switched on, the C2X communication is naturally maintained even when the engine is switched off.

In other words, the second communication unit can be used for C2X in all cases when the engine is running and when the vehicle is stationary in the case of a breakdown.

The junction scenario described above is an exemplary embodiment of the present invention. A core aspect of the invention is that driving authorization communication is used for C2X for the purpose of transmitting selected fundamental data at a low transmission rate. This basic idea can be used generally for C2X applications.

If "normal" C2X communication (via the first communication unit) is already being used for data interchange with vehicles from a large catchment area (for example 300 m) and if it can be assumed that no shadowing is hindering the communication, the communication can take place only using "normal" C2X communication, for example.

For congestion control in the driving authorization communication (that is to say in the communication via the second communication unit), carrier sense multiple access (CSMA) is used, for example. The very complex congestion control for "normal" C2X communication is not necessary, since there is no multi-hop provision for driving authorization communication.

Figure 2:
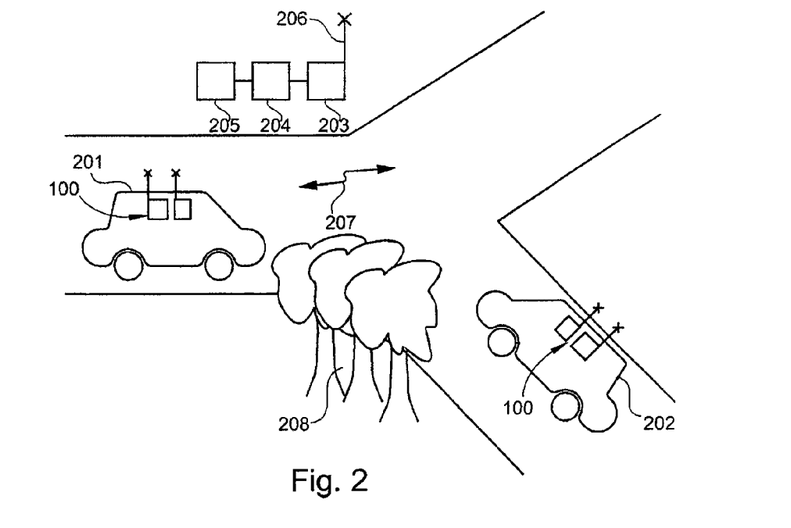
FIG. 2 shows a schematic illustration of an overall system based on an exemplary embodiment of the invention.

FIG. 2 shows a schematic illustration of an overall system based on an exemplary embodiment of the invention. Two vehicles 201, 202 are provided which each have a communication device 100 with two communication units each. In addition, an infrastructure or a control center is provided which comprises a communication unit 203 with an antenna 206, a server 204 and a data memory 205. The two vehicles can communicate with one another and with the control center via the radio transmission link 207, even though an obstacle, e.g. in the form of a wood 208, makes WLAN-based radio transmission impossible.

Figure 3:
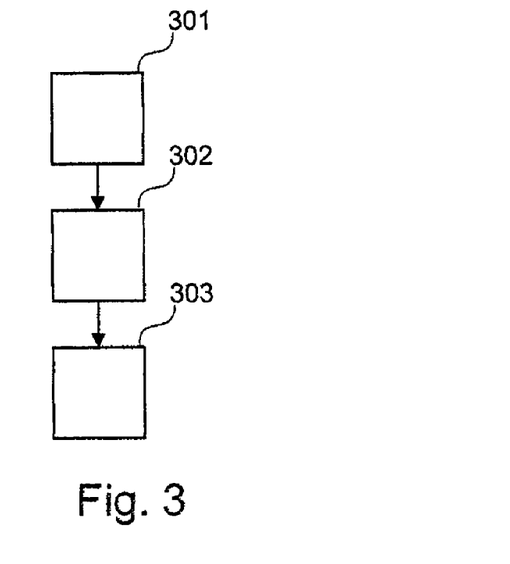
FIG. 3 shows a flowchart for a method based on an exemplary embodiment of the invention.

FIG. 3 shows a flowchart for a method in which, in step 301, selected second vehicle-related data (for example the current vehicle position together with a speed) are transmitted to the other vehicle by a driving authorization system. In step 302, the first vehicle-related data are additionally transmitted to the other vehicle by a first communication unit, for example WLAN-based radio transmission.

In step 303, the data are then transmitted only by means of WLAN, since a safely operating WLAN link has been set up.

The text below describes further exemplary embodiments of the invention which can be implemented independently of one another or else in combination with one another:

First Exemplary Embodiments

Figure 4:
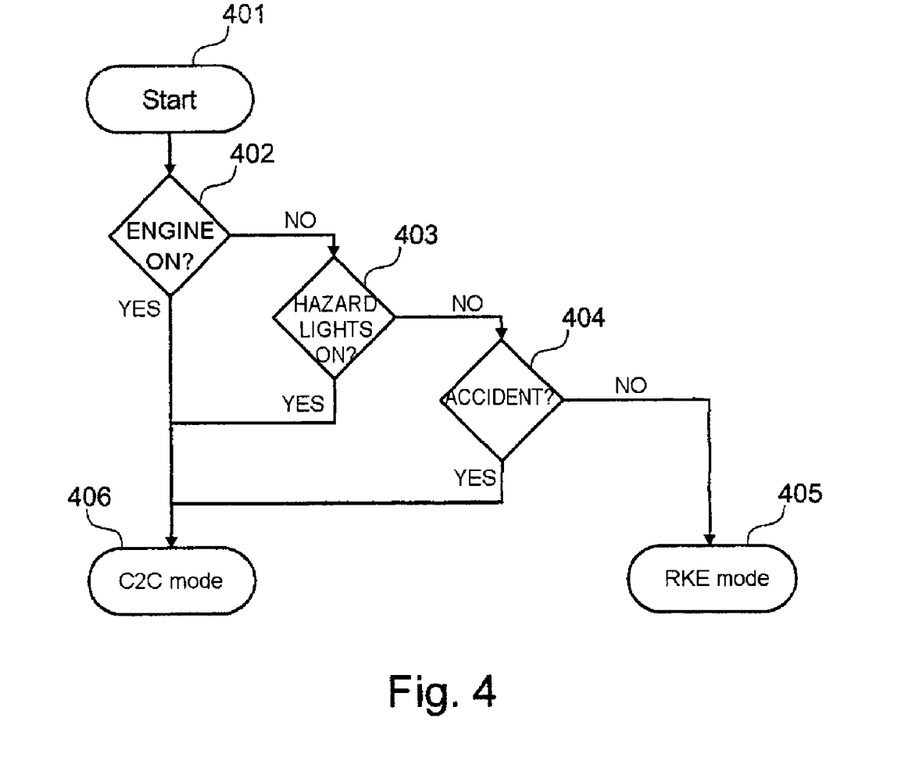
FIG. 4 shows a flowchart for a method based on an exemplary embodiment of the invention.
Figure 5:
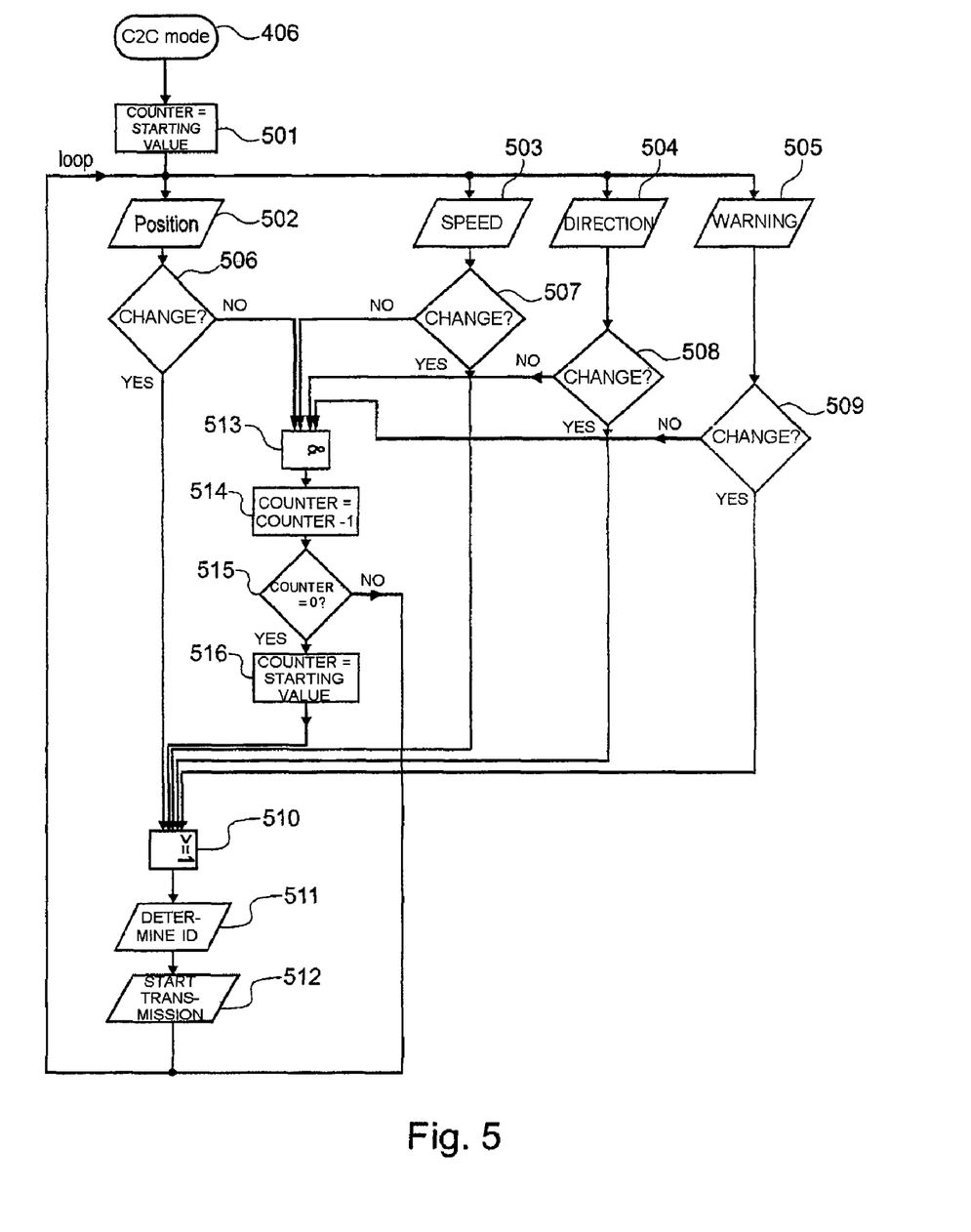
FIG. 5 shows a flowchart for a C2C mode based on an exemplary embodiment of the invention.

FIG. 4 and FIG. 5 show flowcharts for methods based on exemplary embodiments of the invention to illustrate the coexistence C2X, RKE or the use of two communication units.

The coexistence or the processing of both instances of application (C2X and RKE) as an integration step will first of all be illustrated by way of example with reference to FIG. 4. Following once-only initialization [starting] of the radio communication controller in step 401, the vehicle status is requested [in step 402, a check is performed to determine whether the engine is switched on; in step 403, a check is performed to determine whether the hazard lights are switched on; in step 404, a check is performed to determine whether an accident sensor has responded, that is to say whether an accident has been detected] and then the decision-making is performed for the respective mode [C2C mode, RKE mode]. If one of these questions receives a yes response, the system operates in C2C mode. If all these questions receive a no response, the system operates in RKE mode.

In RKE mode, the radio communication controller 102 (see FIG. 1) looks for associated radio signal identification transmitters. For power saving reasons, this can be done by cyclically switching the vehicle receiver or vehicle transceiver on and off. Within the on cycle, the growth sequence of the transmitted key information is analyzed when a button is pressed on the identification transmitter or automatically upon approaching the vehicle in the case of what are known as passive access systems. If the transmitted identification number in the protocol and further technical features (modulation, data rate, etc.) match (see also the thirteenth exemplary embodiments below), the appropriate action is initiated on a vehicle, for example opening or closing the vehicle doors, following a positive check.

In the C2C or C2X mode 406, the counter is set to the starting value in step 501. Information is then requested cyclically, such as the vehicle position 502, speed 503, direction of the vehicle 504, vehicle identification number and any warnings 505 which may be present (for example black ice). This is shown by way of example in FIG. 5.

In steps 506, 507, 508 and 509, a check is performed to determine whether there are any changes.

If rapid changes occur in these parameter sets, transmission takes place more frequently, as already described above.

If no serious changes occur, the data are transmitted 512 by means of radio transmission at a preprogrammed, fixed time and hence cyclically. In this regard, for each pass in which no change in the parameters has been detected (step 513), the counter is reduced by one (step 514). If the counter reaches the zero level (step 515), it is reset to the starting value (step 516) and the data are transmitted. For the transmission, the ID is also determined (step 511), which changes cyclically, but is the same between the two communication technologies (e.g. WLAN and RKE), in order to allow the data to be associated with one another. However, other metrics are also possible for determining the transmission or for determining the transmission rate for data, e.g. derivations from the transmission standard defined in C2C-CC for C2X at 5.9 GHz. It is also possible for the data to be transmitted only if a particularly critical state has occurred or will occur, that is to say there is a risk to life and limb, for example, or if there are particularly poor transmission conditions at 5.9 GHz.

It should be noted that the C2C or C2X mode can, in principle, be extended by further services or modes while traveling too. First, the passive access control systems also require the traveling time to be used to search for the identification transmitters, cyclically at all times, to determine whether they are still within the vehicle and there is driving authorization.

The same applies to radio-based tire pressure control systems which transmit the state of the tires (pressure, temperature, etc.) while traveling.

These modes can also be combined with the C2X mode, since the communication merely needs to be synchronized in terms of time.

The extended modes (passive access control and starting systems and also tire pressure control systems) are not visible in FIG. 5, for reasons of clarity.

In addition, the radio signals can be processed in parallel.

Regarding the use of RKE for "long range" communication:

Known radio-based vehicle access systems (RKE) are oriented to ranges around 30 m in order to avoid inadvertently opening and closing the vehicle from excessive ranges.

However, new technologies allow a bidirectional radio link to be inexpensively provided between identification transmitters and vehicles. This allows up-to-date acknowledgement of the respective closure state. In addition, the bidirectional interface allows further added features, such as requesting of the odometer reading or else safe starting and shutdown of the engine-independent heating system. For the display of some information on the handheld transmitter, a screen display (display) is advantageous.

In order to guarantee a long range of between several hundred meters and kilometers, it is necessary to adapt some parameters. First, efficient antenna structures should firstly be used by both communication subscribers. Secondly, the sensitivity of both receivers of typically −100 dBm should be improved to approximately −120 dBm. As regards the transmission power, it can be stated that this should be as high as possible in so far as this is permitted by the respective approval regulations or the approval (see table 1). By way of example, it may be mentioned that today's RKE identification transmitters have a radiated power of approximately −6 dBm, and communication over long distances requires transmission powers of +14 dBm (for example in the 868 MHz ISM band).

The high-performance transceiver which is therefore present in the vehicle is also outstandingly suitable for the radio communication between the vehicles (C2C) or for C2X communication.

Second Exemplary Embodiments

The methods and systems already described can be used to support or extend vehicle-to-vehicle X communication (C2X) by means of the radio technology of wireless access and driving authorization units.

This involves setting up a radio link at 433 MHz or 800 MHz to 980 MHz (driving authorization communication) in addition to the intended 5.9 GHz (DSRC) in order to use better physical properties of said radio link.

The second exemplary embodiment described below further improves the invention in the area of prioritization and congestion control.

To date, it has been proposed that CSMA be used for congestion control in the driving authorization communication. This is now being extended. If communication by means of DSRC already exists in a parameter around the vehicle, driving authorization communication is no longer used for transmission. This ensures that in areas with a relatively large density of vehicles the low frequency is not overloaded and is free for other tasks.

Vehicles which are hampered in communicating by means of DSRC, for example as a result of visual obstacles, continue to use driving authorization communication for transmission and hence continue to warn the other vehicles, that is to say that they do not become "invisible". If vehicles which now use only DSRC communication for transmission establish that there are further vehicles in the vicinity which use only driving authorization communication for transmission, communication by means of driving authorization is reactivated at a low repetition rate (e.g. 0.25 Hz) in order to supply the concealed vehicle with the most necessary ambient information.

If there is communication by means of DSRC and if driving authorization communication is no longer used to send regular data, the driving authorization communication channel which is then free can be used for prioritization. If an event occurs which enjoys a high level of priority (e.g. ambulance, high risk to life and limb, etc.), this is signaled by means of the driving authorization communication. The other communication by means of DSRC is then stopped and the sender of the important message can now use DSRC to send details.

If an infrastructure unit receives information both on the low frequency and on the high frequency, it can be assumed that not all subscribers are able to communicate with one another. In this case, the infrastructure unit forwards the messages from the high frequency and therefore acts as a kind of relay station (and performs what is known as a multi-hop for the messages). This practice allows the range of messages on the high frequency to be extended without them needing to be permanently forwarded by multi-hop, since multi-hop carries the risk of congestion. Messages which have only just obtained priority over the low frequency are also forwarded by multi-hop so that the distribution thereof can also be ensured on the high frequency.

It is also possible to use the low frequency to request a message on the high frequency. This means it is possible to check whether communication on the high frequency is possible. With such a request, it is also possible to start transmitting messages for a particular situation. It would thus be possible to send a request on the low frequency x meters before a junction, for example, so that the information which is important for the junction is subsequently transmitted on the high frequency.

To improve congestion control, the idea of power transmission control is entertained on the high frequencies. This ensures that only the necessary transmission power is used for transmission and an excessive transmission power does not completely block the frequency band. A change in the transmission power on the high frequency can also be triggered by messages on the low frequency (and vice versa), for example. It is thus possible to prevent, for example, an excessive transmission power from being initially used for transmission just because the high frequency was briefly being shadowed.

Instead of driving authorization communication, it is also possible to use another communication in a low frequency band (such as 700 MHz in Japan). However, driving authorization communication can also be used in addition to this low frequency band. In this case, the opportunity arises to use driving authorization communication to indicate when a frequency change takes place for the communication or parts of the communication between the high frequency and the low frequency, for example.

All the methods are also conceivable in the 5.9 GHz and 700 MHz combination without the use of driving authorization communication. The advantage of driving authorization communication which is already in place is lost in this case, however.

To improve security, it is possible to use algorithms which use both frequencies (driving authorization and DSRC) together so as to make wiretapping, etc., more difficult. This security can be used not only for C2X communication but also for driving authorization in order to ensure a relatively high security standard in both cases.

Shutting down driving authorization communication if DSRC communication is possible relieves the load on the radio channel in the low frequency range. This means that this range can then be used as signaling for important events, which improves congestion control and the prioritization of the DSRC communication.

Crucial points in the second exemplary embodiments are as follows:
  Communication using a low frequency if communication using a high frequency is not possible.
  Communication using the low frequency is stopped if communication using the high frequency is possible.
  Additional communication using the low frequency at a low repetition rate if a message has been received via this channel which makes it possible to infer that the sender cannot communicate using the high frequency.
  Signaling of important events using low frequency. The other communication on the high frequency is then stopped, and then the important information are transmitted on the high frequency.

Third Exemplary Embodiments

Wired information transmission is increasingly on the decline. Today, computers are typically connected to a network by means of WLAN and information/emails/ . . . arrive on cell phones (e.g. Blackberry) by means of cellular radio. Only cars have withstood this trend to date in the wider field. A lot of information is now communicated to the driver exclusively by signs. In the best case, these signs are in the form of changing signs. Even paying for multistory car parks, for example, works only rarely by radio and then by means of proprietary solutions which result in a large number of communication boxes on the dashboards of frequent travelers.

In line with these exemplary embodiments, wireless access and driving authorization units (ignition keys) which operate at 433 MHz (ISM band), or between 800 and 980 MHz, are used as the only wireless form of communication. These units installed in the vehicle may attain a range of up to 1000 m (without obstacles) and, on account of their wavelength, are very easily bent around almost any obstacle. Unfortunately, the frequencies used are not protected ranges, which means that increased interference must always be expected in this area. In addition, there is also only limited bandwidth available for the data transmission.

Despite these restrictions, this technology can be used very well for communication between vehicle and infrastructure (C2I). Examples of applications which also manage with the low obtainable data rate are illustrated below:
  Road signs send the current speed limit, etc., to all vehicles in the surroundings by means of a broadcast. To this end, the possible range of 1000 m is ideally not utilized, but rather a relatively low power is used for transmission so that only vehicles in the vicinity of the sign can receive the information and other vehicles are not irritated. In addition, it is also possible to transmit information regarding the direction, lane, etc. for which the information is valid. This method is very useful for changing signs, in particular.
  Entry authorization for company premises, for example, is granted only if the vehicle can authenticate itself by means of driving authorization communication. If this is not done, the barrier remains down, for example. In this regard, it is even possible to use the same communication as for the driving authorization, and an addition protocol is not needed, since the objective is the same for both. The difference is only that in one instance the key needs to unlock the car and in the other instance the car needs to unlock the barrier.
  It is likewise possible to pay for multistory car parks, road tolls or a city toll, for example, by means of driving authorization communication in conjunction with (sometimes mobile) beacons. The previously existing proprietary solutions can be replaced thereby.
  At large events, there can be dynamic routing to parking lots, for example. To this end, the information about the parking lots to which it is currently necessary to drive can be sent by (mobile) beacons using driving authorization communication. These beacons are situated only at locations at which there can/must be a change of direction of travel. It is therefore also only necessary to transmit the direction to be taken (straight ahead, right, left, 2nd left, . . . ) and an identifier ("large event") to these locations, which means that the necessary data rate can turn out to be very low.

For most of the illustrated exemplary embodiments, a broadcast is suitable, in which the information is sent from the infrastructure to all vehicles in the surroundings. Only if a dedicated vehicle needs to be addressed (as in the case of payment, for example) is a unicast used. The short permitted duty cycle is not a problem for the very undynamic information.

Further applications can be found in relevant lists of C2I applications, as are produced in the Car-to-Car Communication Consortium, for example. In particular, those applications which require a low data rate are advantageously implementable.

One advantage of the use of driving authorization communication is the reuse of already installed components. The different objective (opening the stationary vehicle versus information for a traveling vehicle) also does not produce a case in which the two applications get in each other's way. It is therefore a genuine addition to the functionality without cuts in the original use (driving authorization) at supplementary costs which can be regarded as low overall.

All of the illustrated methods can also be illustrated with other communication technologies. When driving authorization communication is used for the addressed applications, however, only very low supplementary costs are incurred in comparison with another technical solution. Since the two areas of application (opening the stationary vehicle versus information for a traveling vehicle) do not overlap, it is a genuine addition to the functionality without cuts in the original use (driving authorization) at supplementary costs which can be regarded as low overall.

Crucial points in the third exemplary embodiments are the use of driving authorization communication already installed in the vehicle for vehicle-to-infrastructure communication.

Fourth Exemplary Embodiments

Road traffic accidents with pedestrians often occur in confusing situations or because the driver of the motor vehicle has merely not seen the pedestrian. For this reason, intensive development is currently being put into pedestrian recognition by means of video sensor systems. However, these have the same problem as the driver, in principle, that they can only recognize pedestrians who are visible in visual terms from the vehicle.

This is the starting point for the fourth exemplary embodiments. Many modern vehicles are equipped with a "remote keyless entry" function, that is to say with a radio key. Modern versions of these radio keys have a range of 100 m and more. Many pedestrians have vehicles and therefore also have a radio key with them.

This is subsequently used in order to recognize these pedestrians. To this end, the driving authorization unit in the vehicle transmits a "search command" at short intervals while traveling. If a key receives such a search command and the key is not inside a vehicle, it responds with a short confirmation. This confirmation is then received by the vehicle and the driver can be warned. There are several appropriate strategies for warning:

By means of the speed:
a. If the vehicle is in a low speed range and if it can be assumed that pedestrians are expected anyway, it is merely indicated that there are pedestrians in the vicinity, but no explicit warning is output.
b. If the speed is relatively high and it is actually not to be expected that there are pedestrians in the vicinity, a warning is output.

By means of information from a digital map:
a. If the vehicle is in an area or on a road class where pedestrians can be expected, it is merely indicated that there are pedestrians in the vicinity, but no explicit warning is output.
b. If the vehicle is in an area or on a road class where pedestrians are not actually to be expected, a warning is output.

Sometimes, it makes sense to transmit search commands only where pedestrians are not to be expected.

To be able to recognize single keys when there are a plurality of successive search commands, said search commands use the same identifier for requests from a vehicle. This identifier is reselected at random at prescribed intervals (e.g. 10 minutes) and is also different for each requesting vehicle. It is therefore possible to comply with data protection and nevertheless to achieve explicit association for a short time.

As a further function, the transmission of confirmations can be extended by a "community function". To this end, a holder of a key enables the key to additionally be able to output that it belongs to a community. It is then possible to indicate to the driver of a vehicle that there are other members of his community in the vicinity. Such communities could be linked to makes of vehicle (e.g. Mini, VW Golf, . . . ), for example, or to countries of origin, . . . .

In order to be able to easily find a parked vehicle again, radio keys with what is known as an "Autofinder function" are currently being developed. In this regard, the radio keys are equipped with GPS modules. The information from said GPS modules can be used very advantageously for pedestrian warning, since it allows accurate localization of the pedestrians, which means that unnecessary warnings are avoided.

In order to allow improved protection and particularly for children, it is possible to construct simple transponders which process only the pedestrian warning function without working as a radio key. A special reply from these child transponders allows the warning strategy in the vehicle to be influenced in order to allow for the possibly "unpredictable" behavior of children. A similar situation is possible for animals.

The use of already available techniques (driving authorization) allows inexpensive pedestrian recognition. In addition, radio affords the advantage that it is also possible to recognize pedestrians who are not visible in visual terms and hence cannot be recognized by ambient sensors. Even if not all pedestrians can be recognized by this technique, it still affords an inexpensive opportunity to implement additional recognition variants in a vehicle.

Crucial points in the fourth exemplary embodiments are:
Transmission of search commands by the driving authorization unit in the vehicle when the vehicle is moving. Possible transmission only if pedestrians are not to be expected on the basis of the speed and/or map information.
Transmission of confirmation from driving authorization keys which are outside a vehicle if they receive a search command.
Warning to the driver if pedestrians are not to be expected on the basis of map information and/or speed. Otherwise, information to the driver only.
Additional community information if enabled by the holder of the key.
Use of GPS information from the key (if available).
Versions without a radio key function for the purpose of recognizing children and/or animals.

Fifth Exemplary Embodiments

Vehicle-to-vehicle X communication can take place on the basis of IEEE 802.11p. This involves a frequency of 5.9 GHz.

A dedicated control channel can be used (what is known as a dual-receiver concept), or the control channel can be interfaced into the communication channel using a time slot which is synchronized by means of GPS (what is known as a single-receiver concept). The advantage of better timing and greater safety in the dual-receiver concept is in contrast to the lower costs of the single-receiver concept. Another problem of the dual-receiver concept is the comparatively small total bandwidth of C2X, which in Europe is sometimes only 30 MHz in total for all channels.

In line with the fifth exemplary embodiments, additional communication technologies (e.g. WLAN 802.11a/b/g/n or the radio key) can likewise be used for communication between vehicles (and infrastructure). However, these technologies have the drawback that the frequencies used are not protected and hence can be disturbed by other applications.

It is nevertheless appropriate for a 2-channel approach to involve one of the two channels being handled by means of 802.11p and the other being handled by means of the additional communication technology. If there are a plurality of additional communication technologies available, these can be used in parallel in order to improve the immunity of the transmission to interference from other applications on the same frequency band. Fundamental advantages of the second (usually much lower frequency) are the relatively low free space attenuation, that is to say relatively high range for the same transmission power, and the property that relatively low frequencies are better bent around obstacles to sight. The drawback is a relatively low available bandwidth. In addition, the different technologies used reduce the probability of both 11p and the second channel being disturbed simultaneously or failing simultaneously as a result of implementation errors.

It is also possible to use 802.11p in the single-receiver configuration and to use the additional communication technology to set up a dual-receiver configuration in parallel therewith. Thus, the protected frequency of 802.11p is used to safeguard the functionality in all cases and the additional frequency is used to improve performance (timing, prioritization, congestion control, . . . ).

The parallel use of 802.11p at 5.9 GHz and an additional communication technology allows redundancy for safety applications which is advantageous particularly as a result of the different physical propagation properties of the frequencies used. It is thus also possible to improve coverage as a whole and hence the safety of the overall system.

The use of a plurality of communication technologies and frequencies for the various channels of C2X communication achieves redundancy. In addition, transmission reliability is increased, since interference with a frequency can be offset by the other frequencies.

Crucial features of these fifth exemplary embodiments are as follows:
Use of 802.11p at 5.9 GHz as a basis for C2X (possibly in single-receiver configuration).
Use of a second (or a plurality of) additional communication technology(technologies) as a service channel for the C2X communication, for example.

Sixth Exemplary Embodiments

Modern driver assistance systems and driving safety systems typically involve powerful and hence expensive ambient sensors. One exception is the closing velocity sensor (CV sensor) from the Continental company. This sensor is a very inexpensive sensor which is used particularly for applications in the low speed range (city safety). However, its inexpensive design means that it can only provide very little and very coarse information about the surroundings.

This is the starting point for the sixth exemplary embodiments. Many modern cars have what are known as remote keyless entry (RKE) systems installed in them. These systems are used for access control for the vehicle and to this end use a radio link between vehicle and access key. This radio link is now used to exchange further data between two vehicles when a danger has been recognized by means of a CV sensor. To this end, the vehicle equipped with the CV sensor uses RKE to transmit a message. When a vehicle receives this message, it returns useful information. By way of example, this information may be:
The mass of the vehicle;
The width and length of the vehicle, possibly also the height;
That side of the vehicle which is facing the vehicle with the CV sensor (front, rear, left, right);
Vehicle type (private car, commercial vehicle, bus, trailer, etc.);
Bumper height;
Crumple behavior of the vehicle (whether or not there is a crumple zone, etc.), for example;
Position relative to lane marker (if lane recognition is installed in the vehicle);
Steering response of the vehicle;
Speed and acceleration of the vehicle.

This additional information can then be used to perform improved situation interpretation and, on the basis of that, to achieve collision prevention, for example. If it is not possible to prevent the collision, the InCrash measures can be better adapted to the situation. By way of example, the airbag ignitions can be adapted in line with the expected impact (ascertained from the two masses of the vehicles and the relative speed).

A few examples of options for improving the situation interpretation are illustrated below:
The width of the vehicle can be used to better estimate whether evasion is still possible. If a position relative to the lane is also sent, this estimate can even be improved further.
The steering response of the vehicle in front can be used to estimate whether evasion or overtaking in one direction would not result in a collision with the side of the vehicle in front.
The vehicle type can be used to estimate the reactions which can be expected from the vehicle in front. Particularly in the case of trailers, harnessed vehicles and buses, this assists in being able to estimate the situation better.
That side of the vehicle in front which is facing the vehicle can be used to better estimate whether evasion is possible. This is important particularly in the case of very long vehicles.

To improve the InCrash measures, the exemplary embodiments illustrated below are of assistance, for example:
The mass can be used to estimate the severity of the collision and also the course of the collision.
The width of the vehicle in front and the position relative to the lane can be used to estimate how greatly the vehicles overlap and hence whether there is a threat of skidding as a result of the impact.
The bumper height can be used to estimate crash compatibility.
The crumple response can be used to estimate how the system's own vehicle will brake and hence how the airbags need to be ignited.
The vehicle type can be used to estimate everywhere where hits can be expected. By way of example, sports cars mean that it is less of an expectation that there will be hits at the level of the windshield, whereas HGVs present a risk for the entire vehicle.

If appropriate, it is even possible to classify the vehicles, with a class respectively containing vehicles with a similar behavior, e.g. in terms of crumple response, vehicle type, bumper height, etc. In that case, it would then merely be necessary to transmit the vehicle class, and the rest would be stored in a database in the receiving vehicle.

To recognize which vehicle needs to send the data, it is necessary to allow association relative to the requesting vehicle. To this end, it is firstly possible for localization to be performed on the basis of multiple antennas by the RKE module. Another option is for additional data to be interchanged by the requesting vehicle (equipped with the CV sensor). If this vehicle sends its orientation (ascertained by means of GPS or an electronic compass), the viewing direction of the sensor (forward, backward, leftward, rightward, . . . ) and the relative speed (lateral and longitudinal, possibly even only the arithmetic sign of the speed) as well, it is possible for the receiving vehicles in the surroundings to use a comparison with their orientation and their speed in order to recognize whether or not they are meant.

Instead of the RKE communication, it is also possible to use vehicle-to-vehicle (C2C) communication. Ideally, both technologies are used, in order to ensure that the information actually arrives in all cases.

Instead of the CV sensor, it is also possible to use another ambient sensor. However, the cost advantage is obtained particularly if the ambient sensor is as inexpensive as possible. If the ambient sensor is already used for other functions as well, such as ACC, however, then the combination with RKE likewise makes sense, since no additional hardware is to be installed.

For encryption and hence also authentication, AES, TEA (Tiny Encryption Algorithm) or HiTag are appropriate in this case, since these are already used for RKE even today. Particularly AES and TEA are of advantage in this case, since these are OpenSource encryption algorithms and hence have been checked many times.

The communication link can preferably be set up as an ad-hoc network, such as in the case of IEEE 802.15.4 (Zig-Bee) or IEEE 802.11 (WLAN).

Peer-to-peer connections are also possible, as is the case with RKE systems today, or broadcast connections, depending on what information is being transmitted and which radio subscribers need to obtain this information.

The use of the RKS module barely gives rise to additional costs, since this module is already installed in the car. Hence, it is possible to achieve an improvement in operation without having to increase the price for the customer. The CV sensor is likewise a very inexpensive sensor and the combination of both technologies allows a very inexpensive and yet very powerful City Safety package to be wrapped up.

Crucial features of these sixth exemplary embodiments are as follows:
- Recognition of a dangerous situation by an (inexpensive) ambient sensor, such as a CV sensor;
- Subsequent requesting of additional data by means of RKE;
- Use of the additional data for situation interpretation and/or adaptation of InCrash measures, such as airbag ignitions;
- Recognition of whether the request is relevant to a 2nd vehicle, by means of multiple antennas in the case of RKE or orientation and/or GPS/compass data, sensor viewing direction and relative speed;
- Optionally: classification of vehicles, including storage of the relevant parameters for the classes in a database in a vehicle and therefore only interchange of the class ID.

Seventh Exemplary Embodiments

Warning about people on the basis of the technique of wireless driving authorization.

Warning about pedestrians is an important area in the field of vehicle safety. Today, this warning is based primarily on an ambient sensor system which recognizes pedestrians without their needing special equipment. Another possibility is appropriately equipped infrastructure which recognizes pedestrians and then forwards this information to the vehicles.

An intermediate route is provided by the seventh exemplary embodiments. Almost every vehicle today is equipped with wireless driving authorization. Transponders for this technology are now installed in everyday articles for pedestrians, such as bicycle helmets, (rain) coats or else in special pendants for children or old people, for example. Vehicles then transmit a signal at cyclic intervals. The transponders react to said signal with a response, and this response allows the vehicle to recognize that a pedestrian is in the vicinity. All the further explanations of the fourth exemplary embodiments also apply in this case.

The use of transponders for wireless driving authorization means that no additional communication technology is required in the vehicle and hence an appropriate rate of equipment can be achieved on the vehicle much more quickly than with a new communication technology. Furthermore, no costs arise for infrastructure, which is likewise advantageous for current cash-strapped public funds.

The use of wireless driving authorization technology also makes it possible to warn about people who cannot be "seen" by the ambient sensors, for example because they are concealed by parking vehicles.

Ideally, the cyclic signal used is a signal which is the same over all vehicle manufacturers and is not coupled to the encryption algorithm for the wireless driving authorization. This also prevents the driving authorization from being able to be cracked by wiretapping the cyclic signal.

The relatively short range (~5-20 m) of the transponders is advantageous here, since this prevents too many warnings from being received in cities and as a result no further meaningful warnings being able to be provided.

In articles of equipment with a relatively large physical extent, it is sometimes possible to install two antennas in order to allow the cyclic signal to be located and a response to be sent only if the person is not moving away from the vehicle. If the vehicle and the article of equipment are within a certain minimum distance from one another, a response is sent in all cases so as to be prepared even in the event of sudden changes of direction by the person.

The transponder should always be supplied with power, since otherwise it is not possible to achieve the ranges which are necessary for warning about pedestrians. It is therefore appropriate if the level of the power supply (e.g. charge state of the battery) is indicated so as to be externally visible.

1ST EXAMPLE

A child has a pendant which reacts to signals from the wireless driving authorization with a response. Said child is playing by the wayside and is concealed by the parking cars. Nevertheless, vehicle drivers are provided with a warning, since the response from the pendant can be transmitted to vehicles even without a visual link between child and vehicle.

2ND EXAMPLE

A bicycle helmet has antennas installed at the front and back. The cyclic signal from a vehicle is recognized, but it is identified that the vehicle will cross the path of the cyclist only behind him. Therefore, no response is sent. In a 2nd case, it is recognized that the vehicle is approaching from behind. In this case, a response is sent, since the vehicle will very probably overtake the cyclist.

Eighth Exemplary Embodiments

Initiation of a data link by means of car-to-X communication, handling by means of another communication technology.

C2X allows direct association of a message with a vehicle. However, the technology used is typically not designed for high data rates, but rather is designed for the fastest and most frequent interchange of a small number of data items between a large number of subscribers that is possible. If a large volume of data now needs to be interchanged between two dedicated subscribers, C2X on the basis of 802.11p is not designed for this.

This is the starting point for the eighth exemplary embodiments. The communication partner or the communication partners is/are selected by means of C2X, for example on the form of 802.11p. Next, this channel is used to negotiate between the two or more subscribers the communication channel on which the further communication is performed, and the relevant (communication) addresses or telephone numbers are interchanged. This is done in encrypted form, as in the case of an SSL connection, for example. Next, the further communication is initiated and performed on the communication medium which has just been negotiated.

Examples of appropriate communication technologies are WLAN (802.11 a/b/g/n), mobile radio (GSM, GPRS, UMTS, LTE), WiMax, Bluetooth, etc. Particularly WLAN is advantageous, since it is sometimes possible to use the same hardware for C2X and the WLAN connection. Specifically the implementation by means of WLAN is an extension to the method presented in the IEEE 802.11p and IEEE 1609.4 standards, which involves changing over between a control channel and various service channels. In order to receive the important information for the control channel, each receiver needs to switch to the control channel every 50 ms for 50 ms, and a similar technique would also be useful for the use of WLAN based on 802.11a/b/g/n, described above, if the same hardware is used for 11p and the other WLAN standards.

However, it is also appropriate, instead of sending messages via the service channel, to interchange them on another communication path using the technique described above.

A further advantage of this technique is that it also allows an effective bandwidth to be provided for service channels in Europe, as provided in the USA solely by virtue of the frequency band reserved for 802.11p. This means that applications can be developed and used regardless of the field of application.

Description of Eighth Exemplary Embodiments

The driver of a vehicle sees on his screen a map of the surroundings and all the vehicles which are in contact with him by C2X. In this case, the screen is in the form of a touch screen. The driver then selects a vehicle by means of a touch screen and thus initiates the connection to the other vehicle. This other vehicle receives notification of the request to communicate. If this request is accepted, the communication technology is negotiated. This can be done automatically, e.g. on the basis of preselected technologies (for example the driver can exclude mobile radio), or manually using a list of options which the parties involved then need to confirm. Next, the communication between the subscribers takes place on this communication channel.

The selection can also be made by means of voice recognition, e.g. using the license plate of the other vehicle, or automatically by means of a community, etc.

Ninth Exemplary Embodiments

Enabling a communication link by means of wireless driving authorization.

When a communication link is set up between a vehicle and a further appliance or vehicle or the infrastructure today, only the security mechanisms of the respective communication technology are used.

This is the starting point for the ninth exemplary embodiments. The setup of a communication link to the outside or the acceptance of a communication link is enabled by means of wireless driving authorization. Before this enabling is done, the possibility for the vehicle to communicate is not evident from the outside, since the systems are switched off. This also allows power management to be improved.

The activation of a communication technology by means of wireless driving authorization provides the driver with control over communication and additionally improves the security of the system. One example of this is WLAN on account of the very high prevalence and hence the high risk of attacks. Another possibility is the protection of the private domain, since data can be transmitted only if the driver agrees by means of wireless driving authorization. In addition, wireless driving authorization can be used to perform cost control if the communication is subject to costs, such as mobile radio.

If WLAN is used as consumer WLAN and for C2X in parallel, changeover between these modes can likewise be performed by means of wireless driving authorization.

If the range of the wireless driving authorization is too short, a communication technology with a greater range can also be used. It is thus also possible, for example in order to improve the range, for the vehicle authorization data to be read by the computer associated with the relevant communication link and to be transmitted to the car as well in order to open the communication link. Thus, the range of the wireless driving authorization is extended to the range of the communication technology (e.g. WLAN hotspot or mobile radio by means of GSM, GPRS, UMTS, LTE, etc.).

EXAMPLE

Wireless OBD

Today, the OBD interface is read by wire. This can also be done via wireless interfaces, e.g. WLAN. However, it is not wanted that these data can be read by anybody. Therefore, before the interface can be read, this function needs to be enabled by means of wireless driving authorization, e.g., using a dedicated button on the key. Only after this enabling is the WLAN interface activated and the OBD data can be read. If WLAN is already being used for other purposes (e.g. music download), access to the OBD data is enabled by means of WLAN. The enabling expires after a defined time. Within this time, the data need to start being requested. Before the enabling, there is no way of accessing the OBD data by means of WLAN.

EXAMPLE

WLAN for Music Download from Home

The download of music data from home computers to the vehicle is under much discussion. One problem is access to the vehicle when the latter is actually parked. If WLAN is kept active for the whole time, power management is a problem. However, wireless driving authorization must be available at any time anyway. The opportunity therefore arises to activate WLAN by means of wireless driving authorization and otherwise to isolate it from the power supply. The user can then activate the WLAN in the vehicle from home by means of wireless driving authorization and then transmit his data to the vehicle or download them therefrom.

Tenth Exemplary Embodiments

Warning the surrounding traffic after an accident by means of wireless driving authorization.

Today's systems for preventing accidents examine the surroundings, recognize a threatening accident and attempt to prevent said accident by automatically braking. If the accident occurs nonetheless, an automatic emergency call (Ecall) is sent. These systems therefore provide a large amount of information in the vehicle which would also be of use to other vehicles, but the information is not forwarded.

Since modern vehicles are for the most part equipped with wireless driving authorization systems, the opportunity arises to use these units to send information about accidents to other vehicles. This means that it is possible to warn the traffic even before an accident location has been marked with a warning triangle, and hence also to improve safety at the accident location.

Ideally, the warning is transmitted such that it does not matter what method is used to handle the normal driving authorization, i.e. such that it is a simple matter to interchange and understand the warnings across manufacturers. Ideally, this solution can even be retrofitted.

In addition to or instead of the communication by means of driving authorization, vehicle-to-X communication can also take place by means of WLAN (IEEE 802.11a/b/g/n/p), cellular radio (GSM, GPRS, EDGE, UMTS, LTE), WiMax, Bluetooth, etc., for example.

The tenth exemplary embodiments merely use appliances and units which are already available in the vehicle in order to increase vehicle safety. The wireless driving authorization is normally also handled in a frequency band which has good physical propagation properties, which is why warnings can reach the following traffic even in the case of unclear road profiles. In addition, the necessary data are so small that the low data rates of the driving authorization communication does not present any problems.

When an automated emergency call is transmitted (e.g. on account of airbag triggering or on account of manual triggering), a warning is transmitted by means of the driving authorization communication. This warning is sent as a broadcast so that all vehicles in the range of communication receive the warning. In this context, the opportunity arises to use messages from the vehicle-to-X communication, since these are already standardized or are in the process of standardization (for example see SAE 32735, Car2Car Communication Consortium, etc.). These messages also allow the precise location of the accident to be sent and hence a more accurate warning to be presented in the receiving vehicles. However, this requires standardization of the communication by means of driving authorization as a whole.

Another option is to send a defined bit pattern in a defined physical coding cyclically as a warning (similar to SOS using Morse code). This means that only this bit pattern needs to be standardized and the rest of the configuration of the communication for the driving authorization, for example, is unaffected thereby. However, this method no longer has the opportunity for accurate location transmission.

Further reasons for sending the warning may be automatic braking operations on account of collision mitigation systems or automatic emergency braking systems or braking assistants. The opportunity arises to introduce a grading for the warning, with an accident which has actually occurred being provided with the highest warning level, and the avoidance of the accident being provided with a somewhat lower warning level.

In parallel with or instead of the driving authorization communication, it is also possible to use vehicle-to-X communication, or the like.

Eleventh Exemplary Embodiments

Vehicle-to-X communication using a plurality of freely usable frequencies.

For vehicle-to-X communication, a dedicated frequency (5.9 GHz) is today used in the WLAN field (IEEE802.11p). This frequency can only be used for C2X. This ensures that C2X is not disturbed by other applications and hence safety applications using C2X also become possible.

Frequencies which can be used in principle are additionally the freely usable ISM bands (e.g. 433 MHz, 2.4 GHz, 5.8 GHz, etc.) or a range around 868 MHz.

Vacant frequencies can be used by any applications and are therefore not free from interference. This means that they have not been able to be used for applications in vehicle safety to date.

This is the starting point for the eleventh exemplary embodiments. In order to increase the reliability of transmission, a plurality of vacant usable channels are used simultaneously on different frequencies in different (or possibly even the same) frequency bands (that is to say 2.4 GHz, etc.), for example. In the simplest form, all channels are used to send the same information and hence redundancy is increased.

However, better use of the available channels is achieved by means of techniques such as those used in the case of RAID for hard disks. In this context, a communication channel according to the present invention corresponds to a hard disk in a RAID network. Thus, when using RAID 5, which is similar to three channels, for hard disks, it would be possible to achieve an increase in the throughput with simultaneously increased transmission reliability by splitting the information over the individual channels and in so doing always transporting parity or control information additionally in the channels. This ensures that the data are nevertheless reconstructed if only 2 of the 3 channels are received.

If only 2 channels or more than 3 channels are available, it is possible to use other RAID variants or analogies thereof in a similar manner to the example above. Depending on orientation, it is then possible to place more value either on transmission speed or on transmission reliability.

If the transmission speed of the different channels is not the same, the faster channels can be "partitioned", i.e. the fast channel is broken down into blocks which are transmitted periodically in succession (that is to say 1-2-3-1-2-3-1-2-3 . . . , for example) and a block is then allocated to the transmission in the other channels. It is thus possible to break down a fast channel into 3 blocks, for example, with the 1st block being used for the RAID transmission and the other 2 blocks being available for other applications. However, this block formation can also be used to allow a RAID transmission, which requires 3 channels, nevertheless when there are just two channels, by virtue of the respective blocks being treated as a separate channel.

This technique can also be combined with C2X communication based on IEEE802.11p, in which case 802.11p prescribes the speed and therefore only channels with a similar speed can be used. In the case of slower channels, these can be used to transmit only checksums, etc., for protection or only a reduced selection of data, which are then allocated to the data transmitted within 802.11p in a similar fashion to the block concept. If only the basic data are involved, the data can also be transmitted in compressed form, which means that although resolution is lost it is still possible to protect the 802.11p.

In addition to the vacant frequencies and 5.9 GHz, it is also possible to use mobile radio (GPRS, UMTS, LTE) as a channel.

The use of radio hardware which is also present for other applications in the vehicle means that no additional hardware complexity arises for the C2X communication.

1ST EXAMPLE

For the purpose of transmission, 433 MHz, 868 MHz and 2.4 GHz are available. Therefore, in a similar manner to RAID 5, the information is distributed over the individual channels, together with control data. This achieves a relatively high data throughput in comparison with exactly the same data on the 3 channels.

2ND EXAMPLE

For the purpose of transmission, 433 MHz and 2.4 GHz are available. Since 2.4 GHz can be used to transmit significantly more data than 433 MHz in the same time, the channel at 2.4 GHz is broken down into a plurality of blocks, each block being a time T_B long and being repeated after the loop time T_L. The first two blocks of length T_B within a loop T_L are used for transmission according to RAID 5, and the third channel necessary for this is at 433 MHz. The vacant blocks at 2.4 GHz are used for normal internet applications.

3RD EXAMPLE

Channels are available on 433 MHz, 868 MHz, 2.4 GHz and 5.8 GHz. These are connected up in similar fashion to a RAID 10 in order to achieve both a higher data rate and a higher transmission reliability.

4TH EXAMPLE

In addition to 802.11p over 5.9 GHz, 868 MHz is also used. 802.11p also needs to be able to operate without 868 MHz, and therefore no adaptations are made in that case. Since 868 MHz allows only lower data rates than 5.9 GHz, 868 MHz is in each case used to transmit only fractions of the data so that these are then redundant.

Twelfth Exemplary Embodiments

Theft prevention by means of vehicle-to-X communication.

Stolen vehicle tracking involves a stolen vehicle periodically transmitting a piece of information regarding where it is currently located, or the vehicle can be searched for using tracking devices, or the position of the vehicle can be requested.

If a vehicle is reported stolen, infrastructure-to-vehicle (I2C) communication is used to send the relevant license plate and/or the relevant chassis number and/or another explicit identifier for the vehicle by means of a broadcast in the presumed region of whereabouts of the vehicle. This report is periodically repeated until the vehicle has been found or is surrendered. If a vehicle receives its own chassis number and/or its license plate and/or another explicit identifier in this manner, the private domain for this vehicle is lifted. That is to say that no further ID changes are performed but rather the same IDs are used constantly. This simplifies the tracking of the vehicle. In addition, the vehicle periodically sends an identifier by means of vehicle-to-X communication (C2X), which identifies the vehicle as stolen. This means that all the vehicles in radio range can identify the vehicle as stolen and possibly inform the police, or the police themselves can find the vehicle more easily.

In order to prevent misuse, a stolen vehicle report can be sent only by certified locations. Cryptographic methods are used to ensure that these locations can be authenticated by the vehicle and that the communication between the certified location and the vehicle cannot be manipulated.

If a vehicle receives such a report but is not itself the stolen vehicle, it remembers this information and repeats it unchanged (on account of the cryptographic protection) for a period of time T at periodic intervals by means of short-range communication. The vehicle thus effectively acts as a relay station. This ensures that the shutdown of a communication link for infrastructure-to-vehicle communication cannot prevent the stolen vehicle from being found.

If a communication interface is present, no additional hardware is needed.

1ST EXAMPLE

A vehicle is reported stolen to the police in Frankfurt. The vehicle was last seen 2 hours before the report. A report is then sent by infrastructure-to-vehicle communication with the chassis number and the license plate of the vehicle in a perimeter of 400 km around Frankfurt. The vehicle being sought receives the information and then uses short-range communication to send an identifier indicating that it has been stolen and no longer changes its C2X ID, etc.

2ND EXAMPLE

A vehicle is reported stolen to the police in Frankfurt. The vehicle was last seen 1 hour before the report. A report is then sent by infrastructure-to-vehicle communication with the chassis number and the license plate of the vehicle in a perimeter of 200 km around Frankfurt. The vehicle being sought is switched off at this time and therefore cannot receive the report. The report continues to be sent periodically. After a few hours, the vehicle is started again and receives the report shortly afterwards. It then uses short-range communication to send an identifier indicating that it has been stolen and no longer changes its C2X ID, etc.

Thirteenth Exemplary Embodiments

Signal distinction between RKE and C2X.

If RKE is used for C2X, it must be possible to distinguish very quickly whether an RKE signal is involved or a C2X message. Otherwise, all parked vehicles would be "awoken" upon every C2X message and would very quickly use up the vehicle battery. The introduction of what is known as a "fast fall back to sleep mode" is imperative. Furthermore, the RKE useful signals would not be able to be received, since C2X communication would disturb RKE communication. By way of example, the command "open vehicle" is not understood if at the same time a C2X signal is being analyzed in the vehicle at the reception end.

The message structure used in such systems provides what is known as a "wake up" preamble (WUP) in front of the data packet (frame). The vehicle receiver is in "polling mode" (when the vehicle is parked), which involves it cyclically awaking and checking received signals for "wake up" criteria such as reception field strength, modulation parameters (see below) or simple bit patterns.

Various methods are suitable for distinguishing the two modes:
  different baud rates for RKE and C2X;
  different frequency swings for RKE and C2X;
  different modulation types for RKE and C2X (ASK, FSK, PSK, QPSK, SS, etc.);
  different channels for RKE and C2X;
  different frequencies for RKE and C2X;
  different field strength levels for RKE and C2X;
  Manchester Code Detection to distinguish RKE and C2X (code violation or pattern recognition);
  different data patterns for distinguishing RKE and C2X (including within the "wake-up preamble");
  evaluation of the frequency error to determine the transmitter/receiver association.

Combinations of these methods are also possible.

The aim of all of these methods is for a parking car to be able to recognize very quickly whether a message is intended for the car or whether it is a C2X message for the traffic.

Advantages of these thirteenth exemplary embodiments are:
reliable distinction between C2X and RKE functions;
coexistence of the different radio services is made possible;
reduction/elimination of the no-load current problem, increase in battery life.

Fourteenth Exemplary Embodiments

Information from sign gantries by means of RKE.

Traffic is influenced using dynamic road signs, for example in order to adapt the speed limit to the circumstances. However, some of these dynamic signs are very difficult to read automatically with camera systems and therefore the driver continues to be on his own.

This is the starting point for the fourteenth exemplary embodiments. Many modern vehicles are equipped with a radio key which allows the vehicle to be opened by means of radio. This communication technology can now be used to provide the information from the dynamic road signs for the passing vehicles. To this end, the dynamic road signs are equipped with transmitters which transmit on the typical frequency bands of the RKE systems (e.g. 434 MHz and 868 MHz).

Since the range of normal RKE systems is in the region of 10 m, the opportunity arises to use direction antennas in order firstly to extend the range to the necessary region and secondly to disseminate the information only where it is of interest. Thus, with sign gantries, the opportunity arises for the information about the speed limit to be transmitted separately for each lane (see FIG. 6, which shows a front view and a side view of a possible form of the antenna lobes for lane-exact transmission of the information from a sign gantry). The carriageway has two lanes 605, 606, above each of which there is a sign 601, 602 arranged. Each sign radiates a lobe-shaped signal 603, 604.

Figure 6:
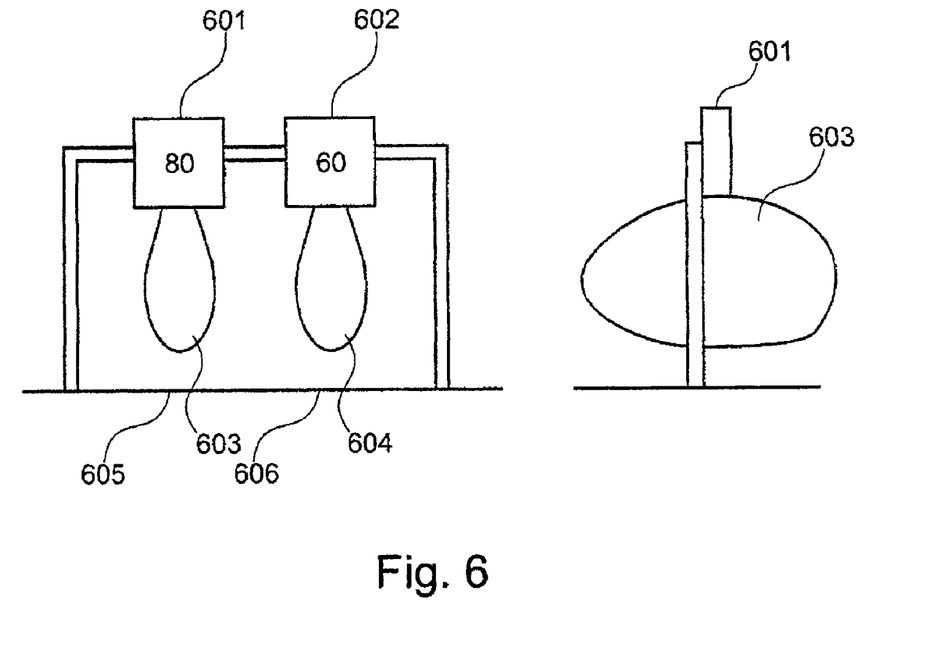
FIG. 6 shows the transfer of information about a speed restriction for each lane separately.

In addition, it is also possible for the speed limits for the other lanes to be transmitted as well. In this case, however, the opportunity arises for the speed limit on the inherent lane to be transmitted more frequently in order to ensure that it is also received by very fast vehicles. If the speed of the vehicles can be measured (e.g. by means of C2X, using whatever communication technology), the protocol can be adapted accordingly. If very fast vehicles are not to be expected, for example, then it is also not necessary for the information for the inherent lane to be transmitted more frequently.

Instead of the speed limit, it is also possible to transmit any other information, such as restrictions on overtaking, hazard warnings, lane closures, congestion warnings, bend warnings, etc. To facilitate understanding, however, the text primarily uses the speed limit as an example.

Instead of sign gantries or dynamic road signs, it is also possible for mobile road signs, such as at road works or (large) events, to be equipped with the technology.

Since the communication technology is already provided in the car, it is available very inexpensively.

1ST EXAMPLE

If a vehicle is traveling at 250 km/h (corresponds to approximately 70 m/s) and if it is assumed that transmitting the speed limit with headers, etc., requires 10 bytes (corresponds to 80 bits) and if it is also assumed that transmission is at 9600 bauds, a communication link over approximately 60 cm is required. This means that the antennas can be developed such that the lobe covers approximately 120 cm (for redundancy) of section length in the reception region. At 1200 bauds, a 5 m communication link is necessary, which corresponds to a section length of 10 m. This estimate already shows that only very little range is required, since only a small amount of information needs to be transmitted (in principle, only the speed limit or the sign information plus the absolutely necessary header information for identifying the message).

2ND EXAMPLE

On a highway, the hard shoulder can additionally be decontrolled if this is necessary. To this end, a dynamic road sign is positioned at the edge of the road. This road sign then additionally sends the decontrolled status of the hard shoulder to the vehicles in the other lanes (e.g. the other 4 lanes) using RKE.

3RD EXAMPLE

On a highway section (e.g. A5 at Frankfurt), the speed limit is indicated for the exact lane by means of dynamic signs. This information is additionally transmitted for the exact lane by means of RKE. In addition, each of these messages also contains the speed limits for the other lanes. By measuring the speed of the vehicles, it has been recognized that all the vehicles are passing the sign gantries at relatively low speed. Therefore, all the speed limits are sent in one message and no redundancy is incorporated for the inherent lane.

4TH EXAMPLE

A sign gantry is used to warn about a hazard in the lane, e.g. as a result of an accident. This information is also transmitted to the affected lane by means of RKE.

In addition, it should be pointed out that "comprising" and "having" do not exclude other elements or steps, and "a" or "an" does not exclude a large number. Furthermore, it should be pointed out that features or steps which have been described with reference to one of the above exemplary embodiments can also be used in combination with other features or steps from other exemplary embodiments described above. Reference symbols in the claims should not be regarded as restrictions.

Fifteenth Exemplary Embodiments

Vehicle-to-X (C2X) communication by means of WLAN is state of the art. The additional use of remote keyless entry (RKE) systems for vehicle-to-X communication has already been illustrated by way of introduction.

In the case of vehicle-to-X communication, the aim is a range of approximately 500 m. If this range is not necessary, for example because a large number of vehicles are in the surroundings, what is known as congestion control is used, which firstly regulates the transmission and forwarding of messages but secondly also reduces the output power of the communication module.

Several methods are available for encoding the communication. Typically, these methods are different in terms of robustness and hence in range for the same output power and in terms of their data rate.

Depending on the situation in which the vehicle finds itself, a different coding is used for the respective communication in order to cover the different requirements in optimum fashion.

A 1st Example Of This Is:

A vehicle is traveling in rural areas on roads without much traffic. High data rates are not necessary in this case, since there are few communication subscribers. However, the ambient conditions require robust transmission. Appropriate coding is therefore used.

A 2nd Example Of This Is:

A vehicle is in a queue. A long range is not necessary here, since there are a very large number of vehicles in the surroundings which would be able to forward the message (if necessary). Therefore, a coding is chosen which allows the highest possible data rate and hence produces low channel allocation per vehicle.

A 3rd Example Of This Is:

A vehicle forms the end of a queue. It is important for as many vehicles as possible which are approaching from behind to obtain this information in order to be warned. Therefore, a coding is chosen which is as robust as possible and hence achieves longer ranges.

A 4th Example Of This Is:

A vehicle is moving at low speed and is not in a situation which is critical to safety, either for itself or for others. Long ranges are therefore not necessary and it is possible to use a coding which allows high data rates.

What has just been described can be used for any form of C2X, that is to say including for C2X based on RKE, for example.

Ideally, the receivers in the vehicles are designed, according to aspects of the invention, such that they can decode all the coding variants and do not need to be in a specific mode in order to be able to receive the different codings. This ensures that a vehicle which sends messages, using coding A can also receive messages with coding B. It is particularly advantageous that one hardware solution a wide range are covered.

1st Example Of Coding:

In the IEEE802.15.4 standard, there are two modes. In one instance, BPSK is used for encoding, which gives data rates of approximately 20 kBits. The other variant is encoded using QPSK, which gives data rates of approximately 100 kBits, but obtains a shorter range than BPSK. First of all, the transmitter is therefore in BPSK mode so that messages actually do reach the receiver. The vehicle is then provided with a warning about the end of a queue and is also in the queue shortly afterward. First of all, it forwards using BPSK in order to warn other vehicles about the end of the queue. After a few vehicles have lined up behind the driver's own vehicle in the queue, however, the vehicle changes to QPSK in order to have higher data rates available, and sends a short message to the surrounding vehicles at regular intervals so that each vehicle in the queue continues to know the approximate dimensions of the queue.

The invention claimed is:

1. A communication device for a vehicle for wirelessly transmitting vehicle-related data to another vehicle or infrastructure, said communication device comprising:
   a first communication unit for transmitting first vehicle-related data to the other vehicle or infrastructure; and
   a second communication unit for transmitting selected second vehicle-related data to the other vehicle or infrastructure,
   wherein the first vehicle-related data are transmitted at a first band-limited frequency, and
   wherein the second vehicle-related data are transmitted at a second band-limited frequency, which is lower than the first band-limited frequency.

2. The communication device as claimed in claim 1, wherein the second communication unit is in the form of a wireless access and driving authorization unit.

3. The communication device as claimed in claim 1, wherein the second vehicle-related data are basic information, selected from the group comprising a vehicle identification, a position of the vehicle, a speed of the vehicle and a direction of movement of the vehicle.

4. The communication device as claimed in claim 1, wherein the second vehicle-related data transmitted are only data which have altered significantly from the last transmission.

5. The communication device as claimed in claim 1, wherein the first vehicle-related data and second vehicle-related data respectively have a vehicle identification; wherein the first vehicle-related data are associated with the second vehicle-related data by means of said vehicle identification.

6. The communication device as claimed in claim 1, wherein the first vehicle-related data and the second vehicle-related data are transmitted in the same format.

7. The communication device as claimed in claim 1, wherein the communication device is configured for junction assistance.

8. The communication device as claimed in claim 1, wherein the communication device transmits the second vehicle-related data only if the engine of the vehicle is running, the hazard lights have been activated or an accident has been detected.

9. The communication device as claimed in claim 1, wherein the second communication unit uses carrier sense multiple access for congestion control in the communication.

10. The communication device as claimed in claim 1, wherein the second communication unit is used for transmitting only prioritized data.

11. The communication device as claimed in claim 1, wherein the second communication unit is configured for communication between the communication device and an infrastructure.

12. The communication device as claimed in claim 1, wherein the second communication unit is configured for periodically transmitting a search command to a pedestrian.

13. The communication device as claimed in claim 1, wherein the second communication unit is configured for providing redundancy for a safety application in the vehicle.

14. The communication device as claimed in claim 1, wherein the communication device is configured for fusing measurement data from a simple ambient sensor with data received from another vehicle or an infrastructure for the purpose of situation interpretation.

15. The communication device as claimed in claim 1, wherein the first communication unit is configured for selecting a communication partner and stipulating which communication device and possibly which communication channel is intended to be used for the further communication between the vehicle and the communication partner.

16. The communication device as claimed in claim 1, wherein the second communication unit is configured to enable a communication link to be set up to the outside and/or to enable a communication link to be accepted.

17. The communication device as claimed in claim 1, wherein the communication device is configured for warning an adjacent vehicle following an accident involving its own vehicle via the second communication unit.

18. The communication device as claimed in claim 1, wherein the communication device is configured for transmitting a notification upon receipt of an inherent identification number for theft prevention.

19. The communication device as claimed in claim 1, wherein the communication device has a sleep mode; and wherein the communication device is configured to be able to decide, in sleep mode, whether a received message is a message specifically for the vehicle or is a general C2X message for a large number of vehicles.

20. The communication device as claimed in claim 1, wherein the communication device is configured for the receipt of messages from a road sign by the second communication unit and for the further use of the received message by a driver assistance system.

21. A driver assistance system having a communication device as claimed in claim 1.

22. A vehicle having a communication device as claimed in claim 1.

23. A communication device for a vehicle for wirelessly transmitting vehicle-related data to another vehicle or infrastructure, said communication device comprising:
a first communication unit for transmitting first vehicle-related data to the other vehicle or infrastructure; and
a second communication unit for transmitting selected second vehicle-related data to the other vehicle or infrastructure,
wherein the first communication unit is configured to transmit the first vehicle-related data on the basis of WLAN.

24. A method for using a communication device as claimed in claim 1 in a vehicle.

25. A method for transmitting vehicle-related data from a vehicle to another vehicle or infrastructure by means of mobile communication, said method having the following steps:
transmitting, by a processor, first vehicle-related data to the other vehicle by a first communication unit; and
transmitting, by the processor, selected second vehicle-related data to the other vehicle by a second communication unit,
wherein the first vehicle-related data are transmitted at a first band-limited frequency, and
wherein the second vehicle-related data are transmitted at a second band-limited frequency, which is lower than the first band-limited frequency.

26. The method as claimed in claim 25, wherein the second communication unit is in the form of a wireless access and driving authorization unit; and
wherein the first communication unit is configured for transmitting the first vehicle-related data on the basis of WLAN.

27. A non-transitory computer-readable medium which stores a computer program product which, when executed on a processor, instructs the processor to perform the following steps:
transmit first vehicle-related data to the other vehicle by a first communication unit; and
transmit selected second vehicle-related data to the other vehicle by a second communication unit,
wherein the first vehicle-related data are transmitted at a first band-limited frequency, and
wherein the second vehicle-related data are transmitted at a second band-limited frequency, which is lower than the first band-limited frequency.

* * * * *